(12) United States Patent
Guercio et al.

(10) Patent No.: US 6,373,925 B1
(45) Date of Patent: *Apr. 16, 2002

(54) TELEPHONE CALLING PARTY ANNOUNCEMENT SYSTEM AND METHOD

(75) Inventors: David J. Guercio; Paul E. Greenwell; David J. Borland, all of Austin, TX (US)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,155

(22) Filed: Sep. 24, 1997

Related U.S. Application Data

(63) Continuation of application No. 08/675,440, filed on Jun. 28, 1996, now abandoned.

(51) Int. Cl.[7] .......................... H04M 1/64; H04M 11/00
(52) U.S. Cl. .......................... 379/82; 379/67.1; 379/76; 379/88.21; 379/93.03
(58) Field of Search .............................. 379/67.1, 88.01, 379/130, 197, 198, 140, 142, 245, 247, 31, 70, 72, 82, 88.03, 88.2, 88.21, 93.01, 93.03, 93.17, 100.05, 157, 158, 201, 202, 88.22–88.27, 76, 80, 88.04, 88.11, 88.12, 88.19

(56) References Cited

U.S. PATENT DOCUMENTS

| | | | |
|---|---|---|---|
| 4,172,967 A | 10/1979 | Porter et al. | 379/167 |
| 4,371,752 A | 2/1983 | Matthews et al. | 379/89 |

(List continued on next page.)

FOREIGN PATENT DOCUMENTS

| | | |
|---|---|---|
| EP | 0 637 158 A1 | 2/1995 |
| GB | 2 240 693 A | 8/1991 |
| GB | 0 622 934 A1 | 11/1994 |
| GB | 2 144 946 A | 3/1995 |
| WO | 95 05045 | 2/1995 |
| WO | WO 97/28631 | 8/1997 |

OTHER PUBLICATIONS http://www.195.net/telephony.htm, Feb. 2, 1998, "Computer Telephony Integration," 2 pages.

(List continued on next page.)

*Primary Examiner*—Allan Hoosain

(57) ABSTRACT

Presented is a telephone calling party announcement system which stores telephone numbers and associated voice messages provided by a user. When an incoming telephone call occurs, and a telephone number of a calling party matches a stored telephone number, an associated stored voice message is played back. Calling party information is provided by Caller ID information transmitted between a first and a second ring signal. If a stored telephone number matches the telephone number portion of the Caller ID information, a stored voice message associated with the telephone number is played back between (or in place of) subsequent ring signals. The stored voice message is typically the name of the calling party, and in this case the name of the calling party is announced between ring signals. A first embodiment includes a voice message unit which receives, stores, and plays back voice messages provided by the user. A caller ID decoder decodes the Caller ID information and provides the decoded Caller ID information to a control unit. The control unit compares the telephone number portion of the decoded Caller ID information to telephone numbers stored in a control memory unit. If a match is found, the control unit asserts a playback control signal which causes the voice message unit to play back an associated stored voice message. In a second embodiment, a digital signal processor (DSP) performs the many of the functions of the voice message unit and the caller ID decoder of the first embodiment.

20 Claims, 6 Drawing Sheets

U.S. PATENT DOCUMENTS

| | | | |
|---|---|---|---|
| 4,481,382 A | 11/1984 | Villa-Real | 455/556 |
| 4,720,848 A | 1/1988 | Akiyama | 379/88 |
| 4,723,271 A | 2/1988 | Grundtisch | 379/181 |
| 4,757,525 A | 7/1988 | Matthews et al. | 379/88.26 |
| 4,776,006 A | 10/1988 | Comerford et al. | 379/159 |
| 4,783,797 A | 11/1988 | Hashimoto | 379/79 |
| 4,787,797 A | 11/1988 | Hashimoto | 379/79 |
| 4,807,225 A | 2/1989 | Fitch | 370/71 |
| 4,893,334 A | 1/1990 | Parnello | 379/157 |
| 4,894,861 A * | 1/1990 | Fukioka | 379/374 |
| 4,899,358 A | 2/1990 | Blakley | 379/284 |
| 4,924,496 A | 5/1990 | Figa et al. | 379/142 |
| 4,985,913 A | 1/1991 | Shalom et al. | 379/76 |
| 5,007,076 A * | 4/1991 | Blakely | 379/61.1 |
| 5,023,868 A | 6/1991 | Davidson et al. | 370/62 |
| 5,062,133 A | 10/1991 | Melrose | 379/94 |
| 5,086,458 A | 2/1992 | Bowen | 379/180 |
| 5,117,451 A * | 5/1992 | Ladd et al. | 379/67 |
| 5,127,049 A | 6/1992 | Sabo | 379/199 |
| 5,157,712 A | 10/1992 | Wallen, Jr. | 379/74 |
| 5,163,083 A * | 11/1992 | Dowden et al. | 379/88 |
| 5,200,994 A | 4/1993 | Sasano et al. | 379/142 |
| 5,220,599 A * | 6/1993 | Sasano et al. | 379/142 |
| 5,265,145 A * | 11/1993 | Lim | 379/88 |
| 5,268,957 A * | 12/1993 | Albrecht | 379/67 |
| 5,283,818 A | 2/1994 | Klausner et al. | 379/67 |
| 5,327,486 A * | 7/1994 | Wolff et al. | 379/96 |
| 5,349,638 A * | 9/1994 | Pitroda et al. | 379/142 |
| 5,384,831 A * | 1/1995 | Creswell et al. | 379/67 |
| 5,388,150 A * | 2/1995 | Schneyer et al. | 379/67.1 |
| 5,394,445 A * | 2/1995 | Ball et al. | 379/67 |
| 5,402,472 A | 3/1995 | MeLampy et al. | 379/67 |
| 5,425,089 A | 6/1995 | Chan et al. | 379/183 |
| 5,440,615 A | 8/1995 | Caccuro et al. | 379/67 |
| 5,452,346 A | 9/1995 | Miyamoto | 379/142 |
| 5,471,522 A | 11/1995 | Sells et al. | 379/93.11 |
| 5,481,594 A * | 1/1996 | Shen et al. | 379/67.1 |
| 5,483,579 A | 1/1996 | Stogel | 379/88 |
| 5,490,205 A * | 2/1996 | Kondo et al. | 379/67.1 |
| 5,497,414 A | 3/1996 | Bartholomew | 379/142 |
| 5,515,422 A | 5/1996 | MeLampy et al. | 379/88.25 |
| 5,522,089 A | 5/1996 | Kikinis et al. | 710/73 |
| 5,550,990 A | 8/1996 | Ensor et al. | 379/67 |
| 5,559,860 A | 9/1996 | Mizikovsky | 379/58 |
| 5,566,231 A | 10/1996 | Sizer, II | 379/142 |
| 5,596,631 A | 1/1997 | Chen | 379/177 |
| 5,604,790 A | 2/1997 | Grimes | 379/67 |
| 5,604,791 A | 2/1997 | Lee | 379/67 |
| 5,604,792 A | 2/1997 | Solomon et al. | 379/67 |
| 5,623,537 A | 4/1997 | Ensor et al. | 379/88.2 |
| 5,644,629 A * | 7/1997 | Chow | 379/142 |
| 5,651,055 A | 7/1997 | Argade | 379/88 |
| 5,652,789 A * | 7/1997 | Miner et al. | 379/201 |
| 5,661,788 A | 8/1997 | Chin | 379/142 |
| 5,809,111 A * | 9/1998 | Matthews | 379/31 |
| 5,822,544 A | 10/1998 | Chaco et al. | 705/2 |
| 5,822,727 A | 10/1998 | Garberg et al. | 704/270.1 |
| 5,838,772 A | 11/1998 | Wilson et al. | 379/88.19 |
| 5,850,435 A | 12/1998 | Devillier | 379/374 |
| 5,883,942 A | 3/1999 | Lim et al. | 379/67 |
| 5,903,628 A | 5/1999 | Brennan | 379/88.21 |
| 5,946,386 A * | 8/1999 | Rogers et al. | 379/265 |
| 5,978,451 A * | 11/1999 | Swan et al. | 379/88.24 |
| 6,021,181 A | 2/2000 | Miner et al. | 379/88.23 |
| 6,058,171 A * | 5/2000 | Hoopes | 379/142 |
| 6,122,347 A | 9/2000 | Borland | 379/70 |
| 6,215,860 B1 | 4/2001 | Johanson et al. | 379/88.28 |

OTHER PUBLICATIONS

"Intelligent Routing," An Aristacom Enhanced Call Processing Application, http://www.aristacomint1.com/routing.htm, Feb. 2, 1998, 3 pages.

VII Voice Integrators, Inc., "What is CTI?," http://www.voiceint.com/whatisct.htm, Feb. 2, 1998, 1 page.

"View Caller ID On Your TV, Caller ID info shows up automatically on the top of your TV screen when the phone rings!," http://www.smarthouse.com/5151.htm, Feb. 2, 1998, 2 pages.

"Talking Caller ID, The Caller ID System that Speaks for itself," http://www.smarthome.com/5154.htm, Feb. 2, 1998, 1 page.

Naganawa et al., "A Study of Audio Communication Devices for ISDN," IEEE Transactions on Comsumer Electronics, vol. 36, No. 3, Aug. 1, 1990, pp. 753–757.

Berger et al., "An Application Specific DSP for Speech Applications," IEEE Transactions on Consumer Electronics, vol. 39, No. 4, Nov. 1, 1993, pp. 733–738.

International Search Report for PCT/US 97/11255, dated Nov. 3, 1997.

Philips News Release, "Hearing is Believing With Magnavox Voice AnnounceTM Caller ID," 1996, Printed out May 1, 1997, 2 pages.

Product Advertisement by ClassCo. Inc., 1996, "Stop Running every time the Phone Rings, Get a Voice Announce Caller IDS from ClassCo," Jan. 5, 1996, Printed out May 1, 1997, 4 pages.

Byte Magazine Special Report, "Caller ID Goes to Work," Jan. 1995, pp. 149–152.

MITEL CMOS MT8843 Data Sheet, Issue 3, Apr. 1996, pp. 5–1 through 5–22.

MITEL MSAN–164 Application Note, Application of the MT8843, Issue 1, Oct. 1996, pp. 5–1 through 5–18.

* cited by examiner

TELEPHONE CALLING PARTY ANNOUNCEMENT SYSTEM AND METHOD

This application is a continuation, of application Ser. No. 08/675,440 filed Jun. 28, 1996, now abandoned.

FIELD OF THE INVENTION

The present invention relates to telecommunications and telephone equipment.

DESCRIPTION OF THE RELATED ART

Telephone companies currently offer subscriber services which provide information about a calling party. These services are commonly referred to as "Caller ID", and are typically available to telephone subscribers for a small monthly fee. Devices which receive, store, and display Caller ID information are also widely available. Information about a calling party is typically received, stored, and displayed by a Caller ID device before a user would normally answer a ringing telephone.

Current telephone systems with caller ID capabilities operate by displaying the caller ID information on a LED screen when a call is received. In current telephone answering systems, the information about a calling party provided by Caller ID is not audibly presented to the calling party. Such audible information would be particularly helpful when it is not convenient to walk to the vicinity of a ringing telephone to read a Caller ID display, or when the user is visually impaired. Therefore, an improved telephone answering system and method is desired which audibly informs the user of the identity of the calling party in response to transmitted Caller ID information.

SUMMARY OF THE INVENTION

The present invention comprises a telephone calling party announcement system which stores telephone numbers and associated voice messages. A series of ring signals alerts a telephone subscriber to an incoming telephone call. Encoded calling party information (i.e., Caller ID information) transmitted between a first ring signal and a second ring signal is decoded, and the telephone number portion of the decoded Caller ID information is compared to the stored telephone numbers. If the telephone number portion of the Caller ID information matches a stored telephone number, a stored voice message associated with the telephone number is played back between or instead of subsequent ring signals. The stored voice message is typically the name of the calling party. In this case the name of the calling party is announced between subsequent ring signals, and before a user would normally answer a ringing telephone. Such an audible announcement would be particularly helpful when it is not convenient to walk to the vicinity of a ringing telephone to read a Caller ID display, or when the user is visually impaired. It is noted that the stored voice message also may also be played back in place of subsequent ring signals.

Proper operation of the telephone calling party announcement system requires that one or more telephone numbers and associated voice messages be provided by the user and stored within the telephone calling party announcement system. A telephone number is provided first, followed by the recording of an associated voice message. In a first embodiment, a control unit receives a telephone number. The telephone number may be the telephone number portion of stored Caller ID information from the last incoming telephone call, or may be entered by the user on a keypad located on a control panel. A voice message unit then receives and stores an associated voice message provided by the user. When storing the voice message, the voice message unit produces a message number associated with the stored voice message, and provides the message number to the control unit. The control unit stores both the telephone number and the message number of the associated voice message in a control memory unit.

When an incoming telephone call occurs, a caller ID decoder decodes the Caller ID information and provides the decoded Caller ID information to the control unit. The control unit compares the telephone number portion of the decoded Caller ID information to all telephone numbers stored in the control memory unit. If the telephone number portion of the Caller ID information matches a stored telephone number, the control unit asserts a playback control signal between subsequent ring signals. The playback control signal includes the message number associated with the telephone number of the calling party. Assertion of the playback control signal causes the voice message unit to play back the stored voice message information associated with the message number. During playback, the voice message unit produces electrical signals associated with the original voice message. These electrical signals are provided to a speaker. The speaker thus broadcasts the voice message between subsequent ring signals. The voice message can thus be used to audibly announce the calling party.

In the preferred embodiment, a digital signal processor (DSP) performs many of the functions of the caller ID decoder and the voice message unit of the first embodiment. An analog-to-digital converter and a digital-to-analog converter provide the necessary conversions for the DSP. In an alternate embodiment, separate discrete logic performs each of the functions.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following publications are hereby incorporated by reference as though fully and completely set forth herein.

Bellcore Technical Reference TR-NWT-000030, "Voiceband Data Transmission Interface Generic Requirements," available from Bellcore Customer Services, Piscataway, N.J.

Bellcore Technical Reference TR-NWT-000031, "Calling Number Delivery," available from Bellcore Customer Services, Piscataway, N.J.

Bellcore Technical Reference TR-NWT-001188, "Calling Name Delivery Generic Requirements," available from Bellcore Customer Services, Piscataway, N.J.

Block Diagram Of A First Embodiment

Figure 1:
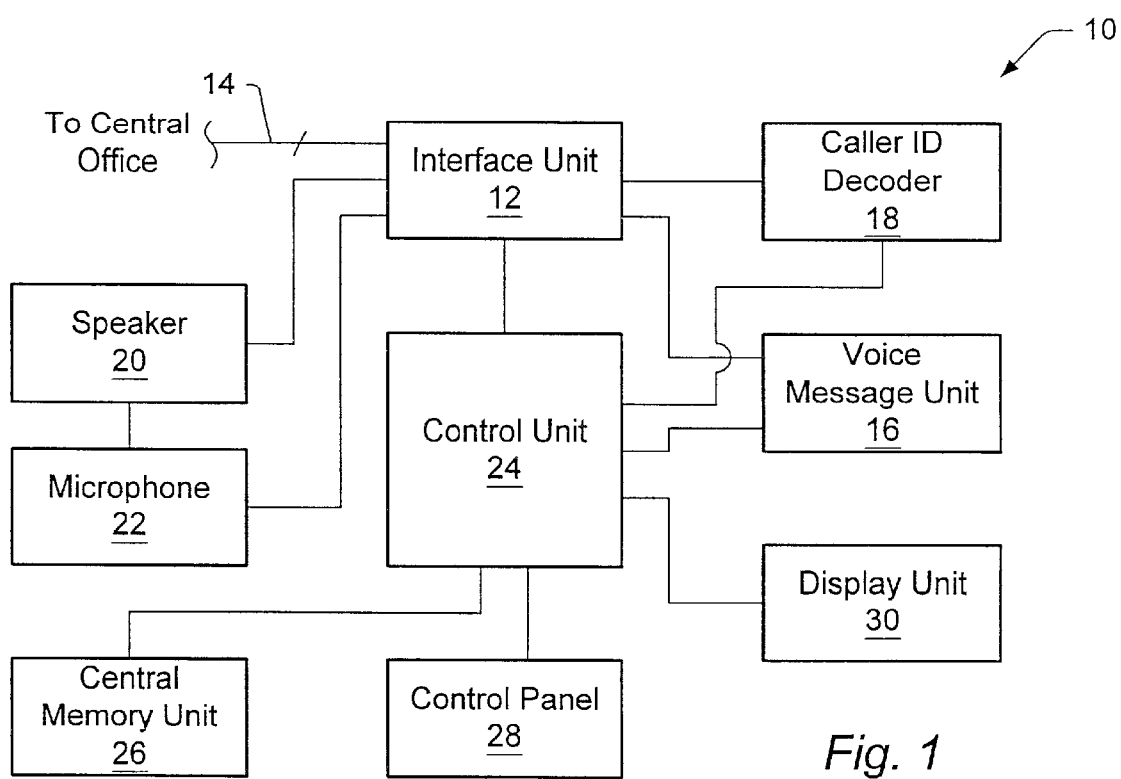
FIG. 1 is a block diagram of a first embodiment of a telephone calling party announcement system.

FIG. 1 is a block diagram of a first embodiment of a telephone calling party announcement system 10. An interface unit 12 is coupled to a central office of an external telephone system via a telephone line 14. Interface unit 12 is also coupled to a voice message unit 16, a caller ID decoder 18, a speaker 20, a microphone 22, and a control unit 24. Control unit 24 is coupled to a control memory unit 26, a control panel 28, and a display unit 30.

A series of ring signals transmitted by the central office over a telephone line causes an ordinary telephone to generate audible signals alerting a subscriber to an incoming telephone call. Currently, information about a calling party (i.e., Caller ID information) is transmitted between a first ring signal and a second ring signal. When telephone calling party announcement system 10 is enabled and a ring signal is detected on telephone line 14, telephone calling party announcement system 10 decodes the Caller ID information. A telephone number portion of the Caller ID information includes the telephone number of the calling party. Caller ID information is transmitted in digital format, one bit at a time, at a rate of 1,200 bits per second. A well-known frequency shift keying technique is used to transmit the data, with a 1,200 Hz tone representing a logical 1 (i.e., a mark) and a 2,200 Hz tone representing a logical 0 (i.e., a space). Caller ID equipment complies with the above set of standards set forth by the Bell Communications Research Group (Bellcore).

Proper operation of the telephone calling party announcement system 10 requires that one or more telephone numbers and associated voice messages be provided by the user and stored within telephone calling party announcement system 10. A telephone number is provided first, followed by the recording of an associated voice message. The telephone number may be the telephone number portion of stored Caller ID information from the last incoming telephone call and displayed by display unit 30, or may be entered by the user on a keypad (not shown) located on control panel 28. Control unit 24 includes a buffer which stores Caller ID information from the last incoming telephone call. Entering the telephone number on the keypad causes the contents of the buffer to be cleared, and the entered telephone number to be stored in the appropriate cells of the buffer. As a telephone number is entered on the keypad and stored in the buffer, control unit 24 causes display unit 30 to display the entered telephone number.

Once a telephone number has been stored in the buffer, an associated voice message may be recorded. Activating one or more electrical switches on control panel 28 causes control unit 24 to assert a control signal which causes interface unit 12 to couple an output port of microphone 22 to an input port of voice message unit 16. Voice message unit 16 thus receives and stores a voice message provided by the user. Voice message unit 16 also produces a message number associated with the stored voice message, and provides the message number to control unit 24. Control unit 24 stores the telephone number in the buffer and the message number in control memory unit 26.

Figure 2:
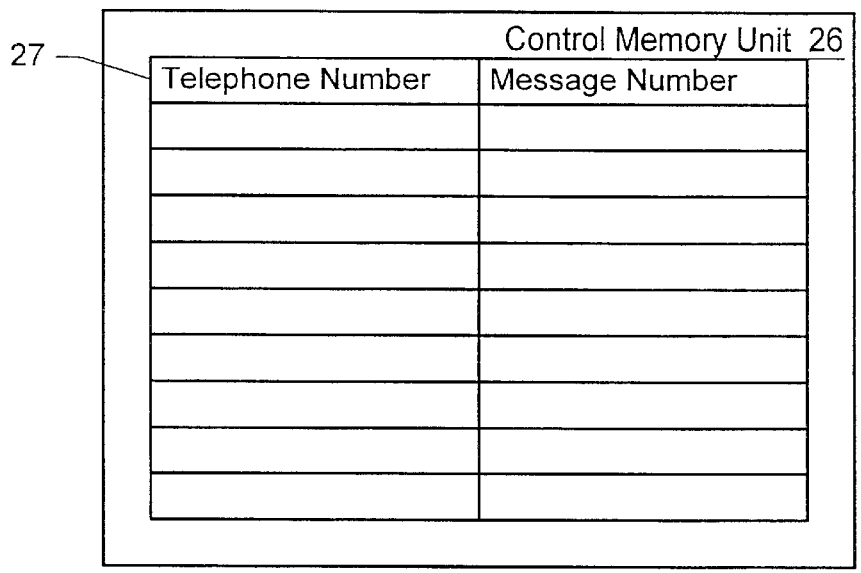
FIG. 2 is a block diagram of one embodiment of a control memory unit of the telephone calling party announcement system.

FIG. 2 is a block diagram of one embodiment of control memory unit 26. Control memory unit 26 preferably comprises one or more non-volatile semiconductor memory devices. Suitable non-volatile semiconductor memory devices include well known electrically erasable programmable read only memory (EEPROM) devices, flash memory devices, and non-volatile random access memory (NV-RAM) devices. Flash memory devices are sometimes called flash EEPROM devices, and differ from EEPROM devices in that electrical erasure involves large sections of, or the entire contents of, a flash memory device. NV-RAM devices are sometimes referred to as battery-backed RAM devices, and comprise volatile RAM cells and a battery which provides backup power to the RAM cells in the event of a failure in a main power supply. Alternately, control memory unit 26 may comprise volatile semiconductor memory devices, with the disadvantage that stored data will be lost if electrical power to control memory unit 26 is interrupted. Suitable volatile semiconductor memory devices include well known RAM devices, including static and dynamic RAM devices. In the embodiment of FIG. 2, control memory unit 26 includes a table 27. Table 27 includes one or more entries, and each entry includes a telephone number and an associated message number. Control unit 24 stores the telephone number and the associated message number as an entry in table 27.

When an incoming telephone call occurs, caller ID decoder 18 decodes the Caller ID information and provides the decoded Caller ID information to control unit 24. The Caller ID information is stored in the buffer. Control unit 24 searches all entries of table 27 in control memory unit 26 for a telephone number which matches the telephone number portion of the decoded Caller ID information. If a stored telephone number in table 27 matches the telephone number portion of the Caller ID information, control unit 24 asserts a playback control signal between subsequent ring signals. The playback control signal causes voice message unit 16 to play back the stored voice message associated with the telephone number. The playback control signal includes the message number from table 27 associated with the stored telephone number. Voice message unit 16 thus plays back the voice message associated with the telephone number of the calling party between subsequent ring signals. It is noted that the stored voice message may also be played back in place of subsequent ring signals.

Voice Message Unit

Figure 3:
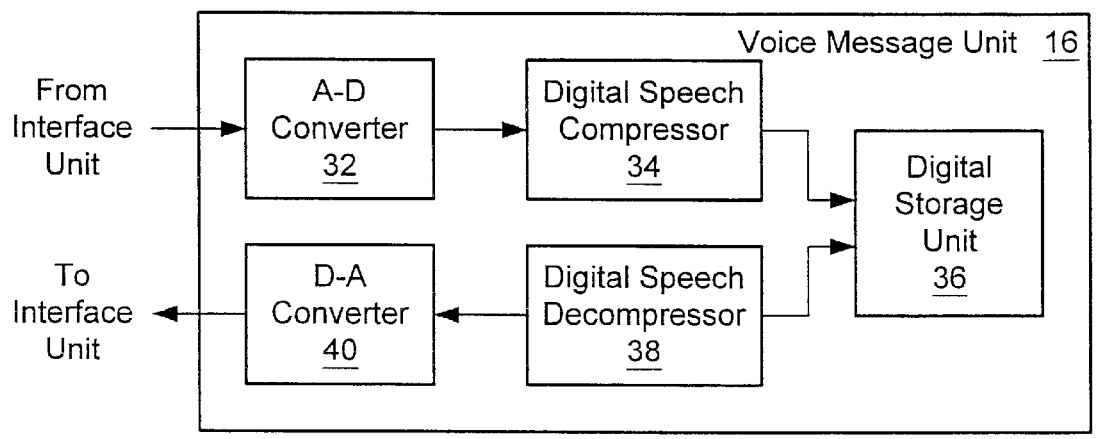
FIG. 3 is a block diagram of one embodiment of a voice message unit of the first embodiment of the telephone calling party announcement system.

Voice message unit 16 records and plays back voice messages. FIG. 3 is a block diagram of one embodiment of voice messaging unit 16 including an analog-to-digital converter 32, a digital speech compressor 34, a digital storage unit 36, a digital speech decompressor 38, and a digital-to-analog converter 40. When a voice message is to be recorded, interface unit 12 connects an output port of microphone 22 to an input port of analog-to-digital converter 32. Analog-to-digital converter 32 converts the analog voice message to a digital representation comprising a stream of digital information. Digital speech compressor 34 is configured to receive the stream of digital information produced by analog-to-digital converter 32 and to produce a compressed version of the digital information. The compressed version uses fewer digital bits to represent the voice message, and hence may be stored using a smaller number of storage locations. One of many known speech compression algorithms may be embodied within digital speech compressor 34. The compressed version of the digital information representing the voice message is then stored in digital storage unit 36. Voice message unit 16 generates a message number associated with the stored representation of the voice message. A portion of digital storage unit 36 may be used to store a table which includes information as to where compressed digitized voice messages are stored within digital storage unit 36.

Figure 4:
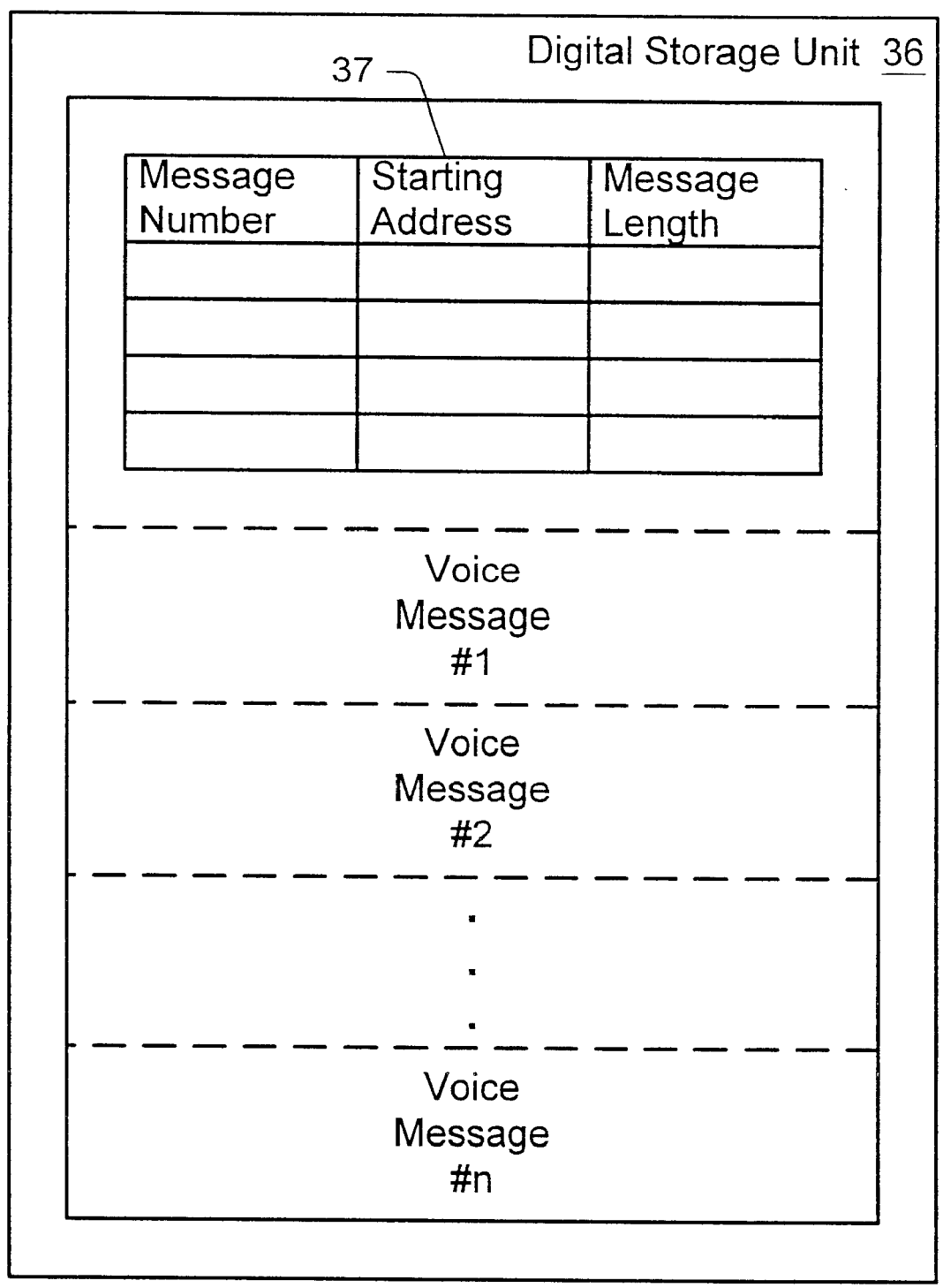
FIG. 4 is a block diagram of one embodiment of a digital storage unit of the voice message unit of FIG. 3.

FIG. 4 is a block diagram of one embodiment of digital storage unit 36. Digital storage unit 36 preferably comprises one or more non-volatile semiconductor memory devices. Suitable non-volatile semiconductor memory devices include well known EEPROM devices, flash memory devices, and NV-RAM devices described above. Alternately, digital storage unit 36 may comprise volatile semiconductor memory devices, with the disadvantage that stored data will be lost if electrical power to digital storage unit 36 is interrupted. Suitable volatile semiconductor memory devices include well known RAM devices, including static and dynamic RAM devices. In the embodiment of FIG. 4, a portion of digital storage unit 36 is used to store a table 37. Table 37 includes one or more entries, and each entry includes a message number associated with a particular voice message stored in digital storage unit 36, an address of the first datum associated with the voice message (i.e., a starting address), and the length of the message (i.e., the number of storage locations used to store the message).

During playback of a voice message, the storage locations within digital storage unit 36 used to store the compressed digital representation are accessed. A message number provided by control unit 24 is used to search table 37 to determine the starting address and the length of the corresponding voice message information. Digital speech decompressor 38 receives a stream of compressed digital information from digital storage unit 36 and produces a stream of digital information representing the original voice message. Digital-to-analog converter 40 receives the stream of digital information and produces an analog representation of the recorded voice message. This analog representation is substantially a copy of the original voice message. Interface unit 12 couples an output port of digital-to-analog converter 40 to an input port of speaker 20. As a result, the voice message is reproduced and emitted by speaker 20.

It is noted that the embodiment of FIG. 4 is directed to prevalent analog telephone service connections. In one embodiment, an ISDN interface chip is included to connect to an ISDN line. Other types of digital embodiments are also contemplated.

Capturing Calling Party Information

Interface unit 12 sends a signal to control unit 24 each time a ring signal is detected on telephone line 14. After a first ring signal is detected, control unit 24 issues a control signal to interface unit 12 which causes interface unit 12 to couple signals on telephone line 14 to an input port of caller ID decoder 18. Control unit 24 also issues a control signal to caller ID decoder 18 which causes caller ID decoder 18 to produce decoded Caller ID information. The decoded Caller ID information is provided to control unit 24. Control unit 24 includes a buffer which stores the decoded Caller ID information. Decoded Caller ID information stored in the buffer may be limited to the date and time of the telephone call (10 digits coded in ASCII format), the name of the calling party (up to 15 characters coded in ASCII format), and the telephone number of the calling party (up to 10 digits coded in ASCII format). Control unit 24 provides the decoded Caller ID information stored in the buffer to display unit 30, then asserts a control signal which causes display unit 30 to display the decoded Caller ID information.

Block Diagram Of A Second Embodiment

Figure 5:
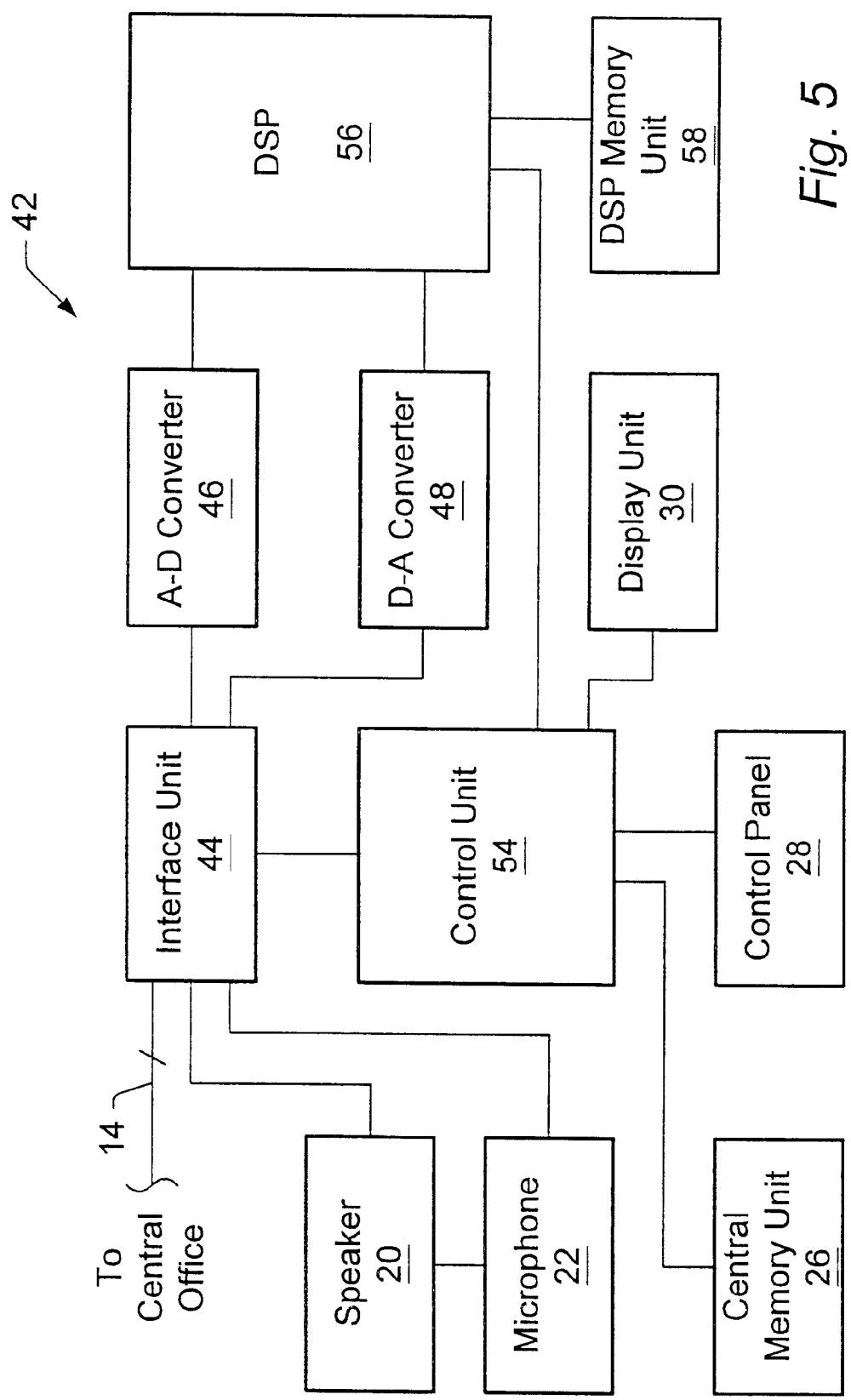
FIG. 5 is a block diagram of a second embodiment of the telephone calling party announcement system.

FIG. 5 is a block diagram of a second embodiment of a telephone calling party announcement system 42. Elements shared with the first embodiment are number as in FIG. 1, and the above descriptions apply. Interface unit 44 is coupled to a central office of an external telephone system via telephone line 14. Interface unit 44 is also coupled to an analog-to-digital converter 46, a digital-to-analog converter 48, a speaker 20, a microphone 22, and a control unit 54. Analog-to-digital converter 46 and digital-to-analog converter 48 are coupled to a digital signal processor (DSP) 56, and DSP 56 is coupled to a DSP memory unit 58. Control unit 54 is coupled to a control memory unit 26, a control panel 28, and to a display unit 30. In the embodiment of FIG. 5, DSP 56 performs the many of the functions of the caller ID decoder and the voice message unit of the first embodiment. Analog-to-digital converter 46 and digital-to-analog converter 48 provide the necessary conversions for DSP 56.

Digital Signal Processor

DSP 56 compresses digitized voice messages, decodes encoded Caller ID information, and decompresses stored compressed digitized voice messages. A suitable DSP is a model ADSP-2171 from Analog Devices, Norwood, Mass. When a voice message is to be recorded, interface unit 12 couples an output port of microphone 22 to an input port of analog-to-digital converter 46. Analog-to-digital converter 46 produces a stream of digitized voice message information, and provides the stream of digitized voice message information to DSP 56. DSP 56 produces a compressed version of the digitized voice message information. DSP 56 may implement one of many known speech compression algorithms. The compressed digitized voice message is then stored in DSP memory unit 58. DSP 56 generates a message number associated with the stored representation of the voice message.

Figure 6:
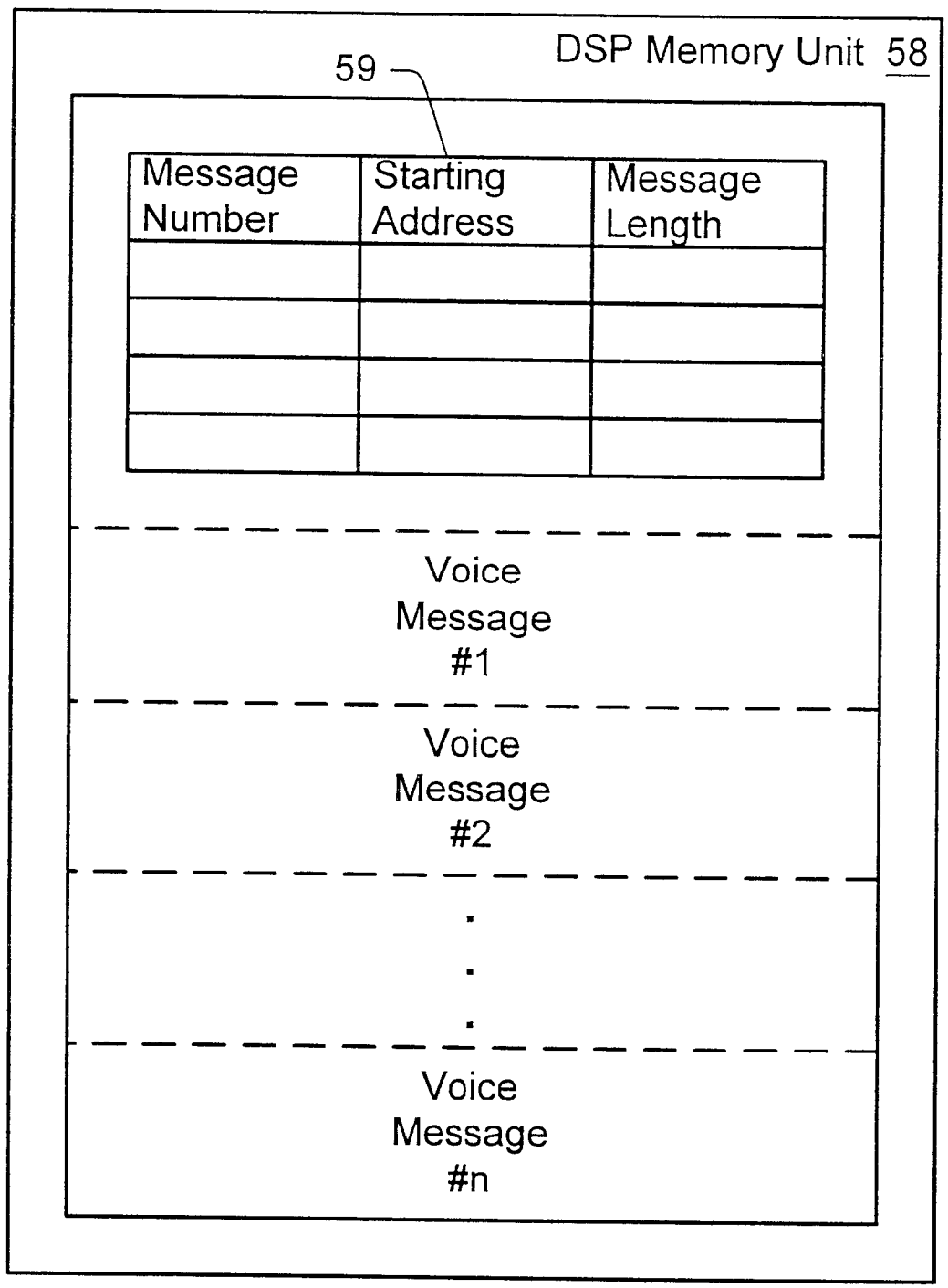
FIG. 6 is a block diagram of one embodiment of a DSP memory unit of the second embodiment of the telephone calling party announcement system.

FIG. 6 is a block diagram of one embodiment of DSP memory unit 58. DSP memory unit 58 preferably comprises one or more non-volatile semiconductor memory devices. Suitable non-volatile semiconductor memory devices include well known EEPROM devices, flash memory devices, and NV-RAM devices described above. Alternately, DSP memory unit 58 may comprise volatile semiconductor memory devices, with the disadvantage that stored data will be lost if electrical power to DSP memory unit 58 is interrupted. Suitable volatile semiconductor memory devices include well known RAM devices, including static and dynamic RAM devices. In the embodiment of FIG. 6, a portion of DSP memory unit 58 is used to store a table 59 which includes information as to where compressed digitized voice messages are stored within DSP memory unit 58. Table 59 contains one or more entries, and each entry includes a message number associated with a voice message stored in DSP memory unit 58, an address of the first datum associated with the voice message (i.e., a starting address), and the length of the message (i.e., the number of storage locations used to store the message).

When an incoming telephone call occurs, interface unit 12 couples an encoded Caller ID signal from telephone line 14 to an input port of analog-to-digital converter 46. Analog-to-digital converter 46 produces a stream of digitized encoded Caller ID information, and provides the stream of digitized encoded Caller ID information to DSP 56. DSP 56 decodes the Caller ID information and provides the decoded Caller ID information to control unit 54. Control unit 54 includes a buffer as described above which stores the decoded Caller ID information. Control unit 54 provides the decoded Caller ID information stored in the buffer to display unit 30, then asserts a control signal which causes display unit 30 to display the decoded Caller ID information.

Table 27 resides in a portion of control memory unit 26, and contains telephone numbers and associated message numbers as described above. Control unit 54 searches table 27 for a telephone number which matches the telephone number portion of the decoded Caller ID information. If a match is found, control unit 54 asserts a playback control signal between subsequent ring signals. The playback control signal causes DSP 56 to play back the associated voice message. The playback control signal includes the message number associated with the telephone number of the calling party. During playback of a recorded voice message, storage locations within DSP memory unit 58 used to store the compressed digital representation of the voice message are accessed. DSP 56 uses the message number provided by control unit 54 to search table 59 in DSP memory unit 58 to determine the starting address and the length of the corresponding voice message information. DSP 56 retrieves the compressed digitized voice message stored in DSP memory unit 58 and produces a stream of digital information representing the original voice message. Digital-to-analog converter 48 receives the stream of digital information and produces an analog representation of the recorded voice message. This analog representation is substantially a copy of the original voice message. Interface unit 12 couples an output port of digital-to-analog converter 48 to an input port of speaker 20. As a result, the voice message is reproduced and emitted by speaker 20.

It is noted that the embodiment of FIG. 5 is directed to prevalent analog telephone service connections. In one embodiment, an ISDN interface chip is included to connect to an ISDN line. Other types of digital embodiments are also contemplated.

Method Flow Chart

Figure 7:
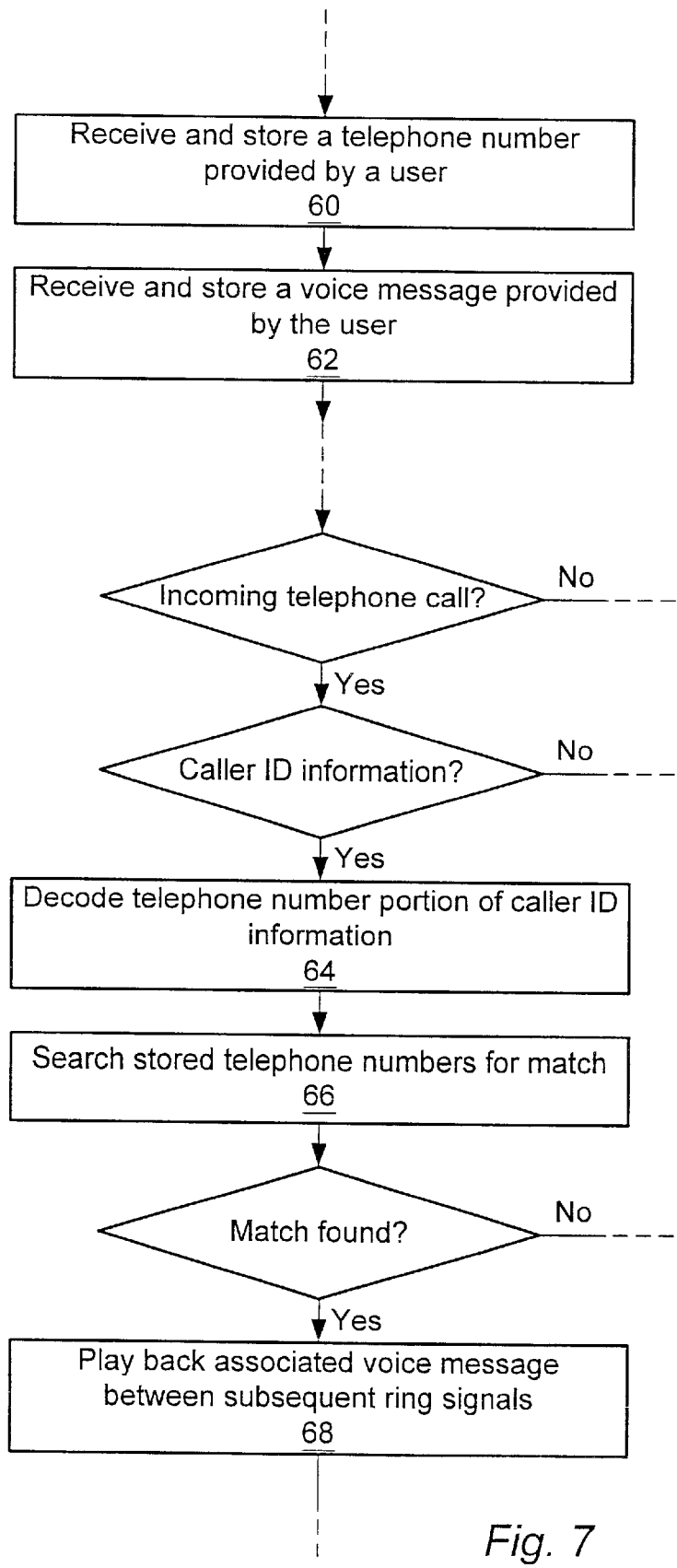
FIG. 7 is a flow chart of a method of announcing a calling party associated with an incoming telephone call in accordance with the present invention.

FIG. 7 is a flow chart of a method of announcing a calling party associated with an incoming telephone call in accordance with the present invention. During a first step 60, a telephone number provided by a user is received and stored. An associated voice message, also provided by the user, is received and stored during a step 62. The telephone number and the voice message may be associated as described above. It is noted that steps 60 and 62 may be repeated several times to store several telephone numbers and associated voice messages. An incoming telephone call including Caller ID information causes a step 64 to be accomplished. During step 64, the telephone number portion of the Caller ID information is decoded. The stored telephone numbers are searched during a step 66 to determine if a store telephone number matches the decoded telephone number portion of the Caller ID information. If a match is found, the associated voice message is played back between subsequent ring signals during a step 68. It is noted that the stored voice message may also be played back in place of subsequent ring signals.

Conclusion

Therefore, the present invention comprises a telephone calling party announcement system which stores telephone numbers and associated voice messages provided by a user. When an incoming telephone call occurs, and a telephone number of a calling party matches a stored telephone number, the associated stored voice message is played back. Calling party information is provided by Caller ID information transmitted between a first ring signal and a second ring signal. If a stored telephone number matches the telephone number portion of the Caller ID information, a stored voice message associated with the telephone number is played back between subsequent ring signals. The stored voice message is typically the name of the calling party, and in this case the name of the calling party is announced between subsequent ring signals and before a user would normally answer a ringing telephone. It is noted that the stored voice message may also be played back in place of subsequent ring signals.

A first embodiment includes a voice message unit which receives, stores, and plays back voice messages provided by the user. A caller ID decoder decodes the Caller ID information and provides the decoded Caller ID information to the control unit. The control unit compares the telephone number portion of the decoded Caller ID information to all telephone numbers stored in a control memory unit. If the telephone number portion of the Caller ID information matches a stored telephone number, the control unit asserts a playback control signal which causes the voice message unit to play back an associated stored voice message. Electrical signals associated with the original voice message are provided to a speaker between subsequent ring signals.

In a second embodiment, a digital signal processor (DSP) performs the many of the functions of the voice message unit and the caller ID decoder of the first embodiment. An analog-to-digital converter and a digital-to-analog converter provide the necessary conversions for the DSP. The DSP compresses digitized voice messages, stores them in a DSP memory unit, and decompresses compressed digitized voice messages stored in the DSP memory unit when the playback control signal is asserted. The DSP also decodes Caller ID information and provides the decoded Caller ID information to the control unit. During playback of a stored voice message, the DSP provides a reproduced digitized voice message to the digital-to-analog converter, and the digital-to-analog converter reproduces analog electrical signals associated with the original voice message. The analog electrical signals produced by the digital-to-analog converter are provided to a speaker, which reproduces the voice message. The reproduced voice message is substantially a copy of the original voice message, and is broadcast by the speaker between subsequent ring signals.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A telephone calling party announcement system, comprising:
    a voice message unit coupled to receive a voice message and a playback control signal, wherein the voice message unit is configured to store the voice message, and wherein the voice message unit is configured to provide the stored voice message when the playback control signal is asserted;
    a caller ID decoder coupled to receive encoded calling party information after a ring signal has been received by the telephone calling party announcement system, wherein the telephone calling party announcement system is configured to audibly generate an initial ring in response to the ring signal received prior to the encoded calling party information, and wherein the caller ID decoder is configured to produce decoded calling party information, wherein the decoded calling party information comprises a telephone number portion; and
    a control unit coupled to receive the decoded calling party information, wherein the control unit is configured to provide the playback control signal, and wherein the control unit asserts the playback control signal if the telephone number portion of the decoded calling party information matches a previously stored telephone number associated with the voice message;
    wherein in response to assertion of the playback control signal, the voice message is audibly played after the initial ring and in place of audible rings from any subsequent ring signals.

2. The telephone calling party announcement system as recited in claim 1, wherein the encoded calling party information comprises Caller ID information transmitted over a telephone line.

3. The telephone calling party announcement system as recited in claim 1, wherein the telephone number portion of the decoded calling party information comprises a telephone number of a calling party.

4. The telephone calling party announcement system as recited in claim 1, further comprising a display unit coupled to receive said decoded calling party information and configured to display said decoded calling party information.

5. The telephone calling party announcement system as recited in claim 1, wherein the voice message is provided by a user and comprises the name of a calling party, and wherein the previously stored telephone number is provided by the user.

6. The telephone calling party announcement system as recited in claim 5, further comprising a control memory unit, wherein the control memory unit is coupled to receive and configured to store a voice message telephone number, wherein the previously stored telephone number is the voice message telephone number.

7. The telephone calling party announcement system as recited in claim 6, wherein the voice message unit is configured to produce a message number associated with the voice message, and the control memory unit is coupled to receive the message number and configured to store the message number in association with the voice message telephone number.

8. The telephone calling party announcement system as recited in claim 7, wherein an incoming telephone call causes the control unit to search the control memory unit to determine if the voice message telephone number matches the telephone number portion of the calling party information.

9. The telephone calling party announcement system as recited in claim 8, wherein the playback control signal comprises the message number associated with the voice message.

10. The telephone calling party announcement system as recited in claim 1, wherein the voice message unit comprises:
- an analog-to-digital converter coupled to receive the voice message and configured to convert the voice message into digital information associated with the voice message;
- a digital storage unit coupled to receive and configured to store the digital information associated with the voice message; and
- a digital-to-analog converter coupled to receive the digital information associated with the voice message and configured to generate an analog voice message from the digital information.

11. A telephone calling party announcement system, comprising:
- an interface unit coupled to receive a voice message and encoded calling party information, wherein the interface unit is configured to produce a corresponding analog signal, and wherein the encoded calling party information is received after a ring signal has been received by the telephone calling party announcement system, wherein the telephone calling party announcement system is configured to audibly generate an initial ring in response to the ring signal received prior to the encoded calling party information;
- an analog-to-digital converter coupled to receive the analog signal and configured to produced a corresponding digital signal;
- a digital signal processor (DSP) coupled to receive the digital signal and a playback control signal, wherein the DSP is configured to produce:
  - a compressed digitized voice message when the digital signal corresponds to the voice message;
  - decoded calling party information when the digital signal corresponds to encoded calling party information, wherein said decoded calling party information comprises a telephone number portion; and
  - a reproduced digitized voice message when the playback control signal is asserted, wherein the reproduced digitized voice message is a digitized version of the voice message;
- a DSP memory unit coupled to receive and configured to store the compressed digitized voice message;
- a digital-to-analog converter coupled to receive the reproduced digitized voice message and configured to produce a reproduced voice message, wherein the reproduced voice message is substantially the voice message; and
- a control unit coupled to receive the decoded calling party information, wherein the control unit is configured to provide the playback control signal, and wherein the control unit asserts the playback control signal if the telephone number portion of the decoded calling party information matches a previously stored telephone number associated with the voice message;
- wherein in response to assertion of the playback control signal, the reproduced voice message is audibly played after the initial ring and in place of audible rings from any subsequent ring signals.

12. The telephone calling party announcement system as recited in claim 11, wherein the encoded calling party information comprises Caller ID information transmitted over a telephone line.

13. The telephone calling party announcement system as recited in claim 11, wherein the telephone number portion of the decoded calling party information comprises a telephone number of a calling party.

14. The telephone calling party announcement system as recited in claim 11, further comprising a display unit coupled to receive the decoded calling party information and configured to display the decoded calling party information.

15. The telephone calling party announcement system as recited in claim 11, further comprising a control memory unit, wherein the control memory unit is coupled to receive and configured to store a voice message telephone number, wherein the previously stored telephone number is the voice message telephone number.

16. The telephone calling party announcement system as recited in claim 15, wherein the DSP is configured to produce a message number associated with the voice message, and wherein the control memory unit is coupled to receive the message number and configured to store the message number in association with the voice message telephone number.

17. The telephone calling party announcement system as recited in claim 16, wherein an incoming telephone call causes the control unit to search the control memory unit to determine if the telephone number portion of the calling party information matches the voice message telephone number.

18. The telephone calling party announcement system as recited in claim 17, wherein the playback control signal comprises the message number associated with the voice message.

19. The telephone calling party announcement system as recited in claim 15, wherein the voice message and the voice message telephone number are provided by a user.

20. A method of announcing a calling party of an incoming telephone call, comprising:

receiving and storing a telephone number and an associated voice message provided by a user;

receiving an incoming telephone call comprising encoded calling party information and an initial ring signal, wherein the encoded calling party information comprises a telephone number portion;

audibly ringing in response to the ring signal, wherein the ring signal is received prior to the encoded calling party information;

decoding the telephone number portion of the encoded calling party information; and if the decoded telephone number portion matches the stored telephone number, playing back the stored voice message after said audibly ringing instead of audibly ringing in response to any subsequent ring signals.

\* \* \* \* \*

UNITED STATES PATENT AND TRADEMARK OFFICE
CERTIFICATE OF CORRECTION

| | |
|---|---|
| PATENT NO. | : 6,373,925 B1 |
| DATED | : April 16, 2002 |
| INVENTOR(S) | : David J. Guercio, Paul E. Greenwell and David J. Borland |

It is certified that error appears in the above-identified patent and that said Letters Patent is hereby corrected as shown below:

<u>Title page,</u>
Item [73], Assignee, please delete "Siemens Aktiengesellschaft, Munich (DE)" and insert -- Legerity Inc., Austin, TX (US) -- in place thereof.

Signed and Sealed this

Seventeenth Day of September, 2002

*Attest:*

JAMES E. ROGAN
*Director of the United States Patent and Trademark Office*

*Attesting Officer*